INVENTORS
ROBERT H. HANES
ROBERT J. YOUNGQUIST
BY
Carpenter, Abbott, Coulter & Kinney
ATTORNEYS INVENTORS
ROBERT H. HANES
ROBERT J. YOUNGQUIST
BY
Carpenter, Abbott, Coulter & Kinney
ATTORNEYS INVENTORS
ROBERT H. HANES
ROBERT J. YOUNGQUIST
BY
Carpenter, Abbott, Coulter & Kinney
ATTORNEYS Oct. 15, 1963 R. H. HANES ETAL 3,107,279

TRANSDUCING APPARATUS AND CARTRIDGE THEREFOR HAVING DUPLICATE COAXIAL REELS

Filed Dec. 20, 1956 4 Sheets-Sheet 4

INVENTORS
ROBERT H. HANES
ROBERT J. YOUNGQUIST
BY
Carpenter, Abbott, Coulter & Kinney
ATTORNEYS United States Patent Office 3,107,279 Patented Oct. 15, 1963

3,107,279

TRANSDUCING APPARATUS AND CARTRIDGE THEREFOR HAVING DUPLICATE COAXIAL REELS

Robert H. Hanes, Stillwater, and Robert J. Youngquist, St. Paul, Minn., assignors to Minnesota Mining and Manufacturing Company, St. Paul, Minn., a corporation of Delaware Filed Dec. 20, 1956, Ser. No. 629,747
10 Claims. (Cl. 179—100.2)

This invention relates to transducing apparatus for recording sound on an elongated flexible medium and for reproducing sound from such medium. More particularly the invention relates to an improved magnetic recorder and an improved cartridge and reels adapted to coact with the recorder elements in a novel and beneficial manner.

To facilitate the feeding to transducing apparatus of flexible record media, e.g., magnetic tape, wire or film, magazines or cartridges containing one or more reels and the media have been developed and some of them have attained a degree of commercial success. However, the cartridges heretofore provided have not been entirely satisfactory for one or more of a number of reasons. They are either relatively expensive or difficult to load, some of them are not reliable and tend to jam after a period of use, the reels contained in the cartridge cannot be run at relatively high speeds in forward and reverse directions as well as at a lower recording and play-back speed, and where a multiple lane medium has been usable in the cartridge, relatively expensive and complex mechanisms are required to shift from one lane to another.

By the present invention we obviate the foregoing and other undesirable features of known cartridges and the coacting elements of the transducing apparatus.

An object of this invention is to provide a compact, simple and inexpensive cartridge embodying novel reels and means for removably retaining the reels in the cartridge.

A further object is to provide a cartridge containing coaxial reels formed with central bearing openings adapted to receive spindles projecting from the transducing apparatus, each reel having a driving connection with one of the spindles whereby either reel may be operated as the take-up reel without changing the position of the cartridge, or shifting from one magnetic head to another.

Another object is to provide a cartridge adapted to contain magnetic tape having a plurality of record lanes and so constructed as to present a selected lane or lanes for recording and playback, the cartridge being adapted to be inverted on the recording apparatus to selectively present another lane or lanes in operative relation to the transducing elements.

A still further object is to provide a cartridge of the class described with a pair of symmetrical duplicate reels which may be removed from the cartridge case and used separately from the cartridge with novel transducing apparatus constructed for use with the improved cartridge.

A particular object is to provide a cartridge having a casing containing a pair of reels and having walls formed with openings adapted to receive all of the coacting elements of the transducing machine including spindles for supporting and turning the reels and the transducing, guiding and medium feeding elements for contact with the flexible medium.

A further and particular object is to provide in a cartridge of the class described unusually simple and low cost means for retaining the reels against rotation in the cartridge when the latter is removed from the transducing apparatus.

The invention also includes certain other novel features of our transducing apparatus and cartridge which will be described in the following specification and hereinafter claimed.

Referring to the accompanying drawings which illustrate embodiments of our invention, by way of example and not for the purpose of limitation:

Figures 7, 8, 9, 10:
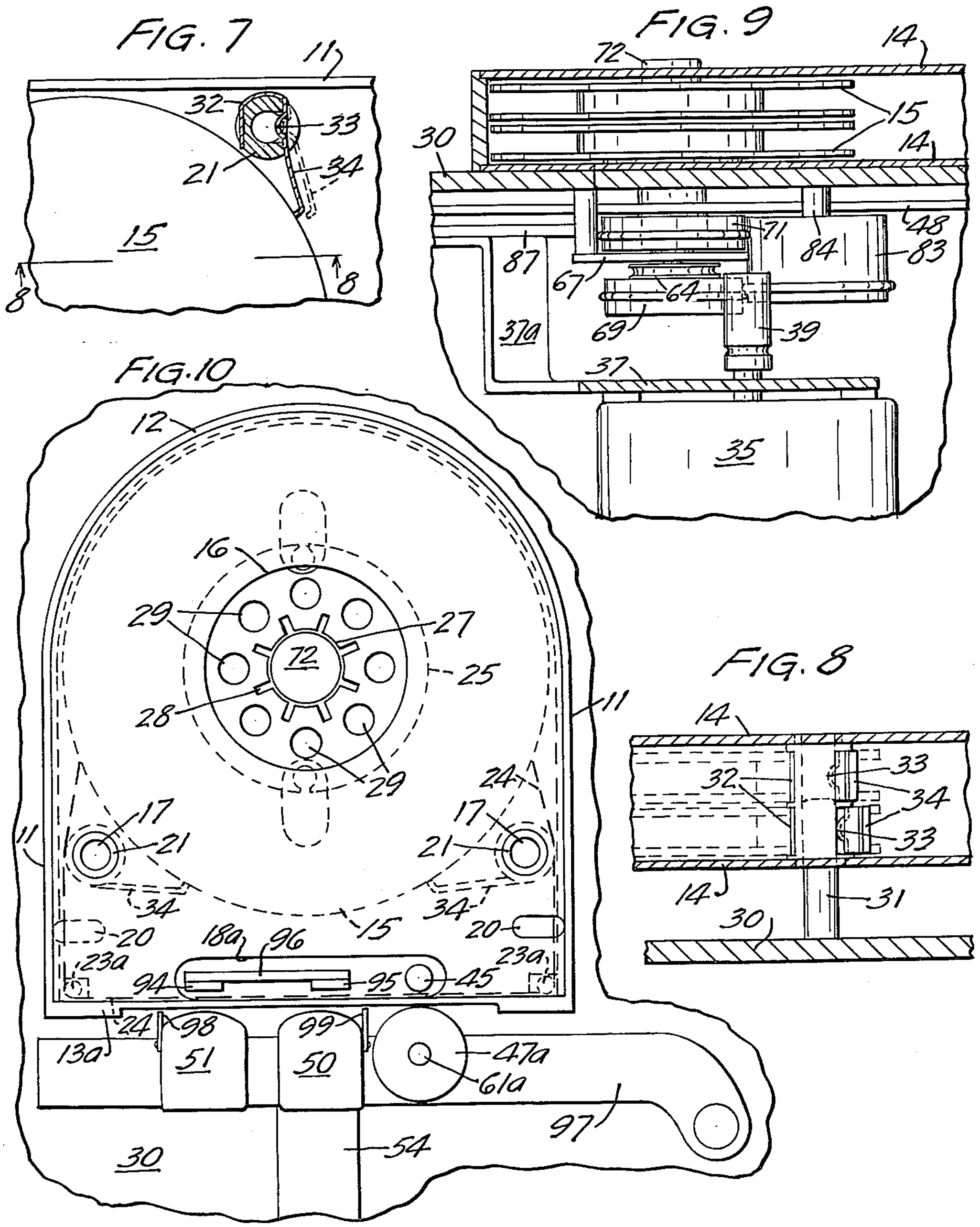
FIG. 7 is a fragmentary part plan view and part horizontal sectional view showing details of one of the reel detent members, with the top wall of the cartridge removed.
FIG. 8 is a vertical sectional view showing a cartridge and a locator pin in position wherein the pin projects only part way in the cartridge bearing member.
FIG. 9 is a fragmentary section taken approximately on the line 9—9 of FIG. 1.
Figure 11:
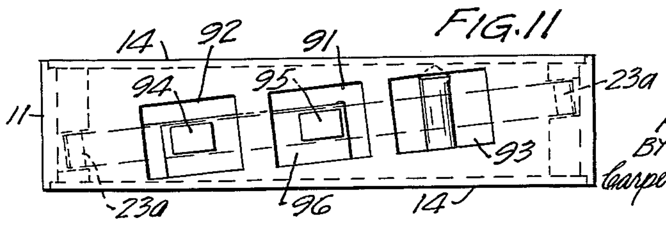

FIG. 10 is a plan view showing a second embodiment or modification of our cartridge and also showing, diagrammatically, a modified arrangement of the transducing elements which coact with the modified cartridge, and FIG. 11 is a front elevational view of the modified cartridge and showing the coacting transducing machine elements which project through an opening in the bottom wall of the cartridge.

Figure 3:
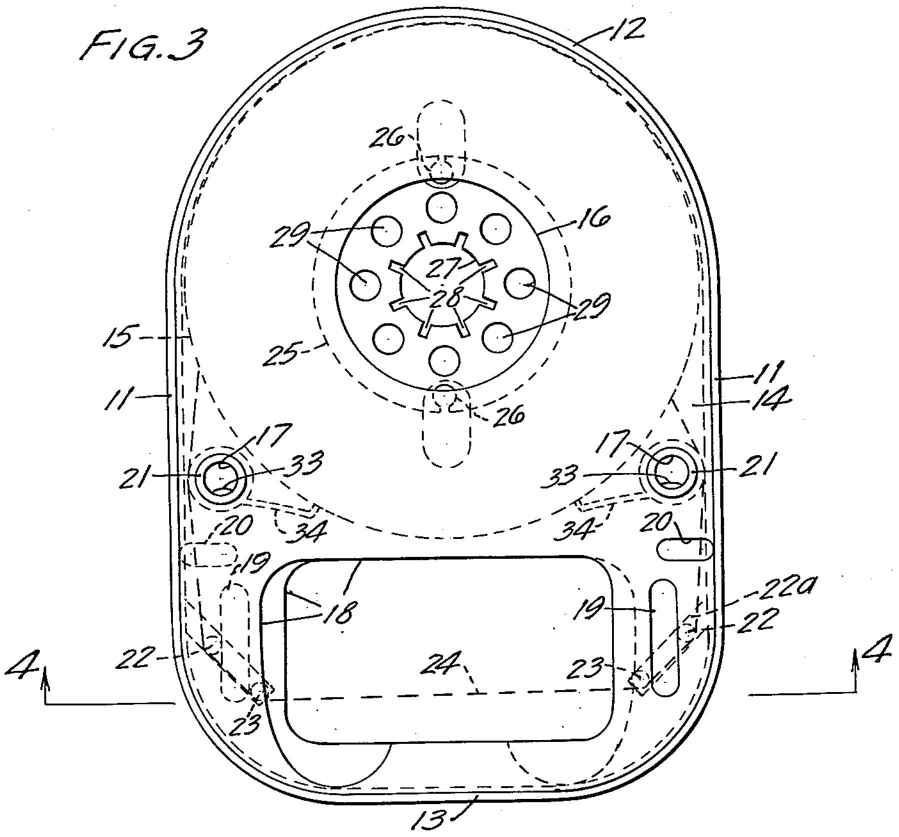
FIG. 3 is a top plan view of the first embodiment of our cartridge, separate from the transducing apparatus.
Figure 4:
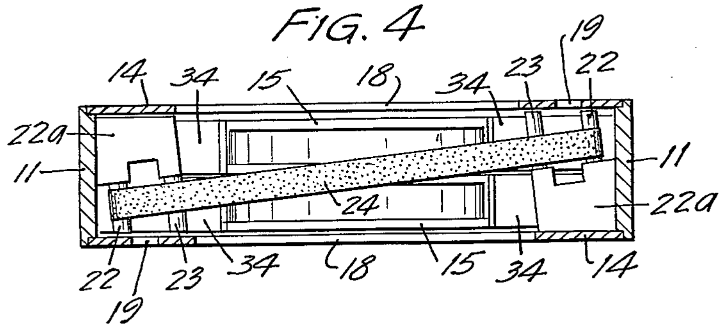
FIG. 4 is a cross sectional view taken on the line 4—4 of FIG. 3.

As best shown in FIGS. 3 and 4, the first embodiment of our cartridge has a casing comprising normally vertical walls 11 joined by an arcuate end wall 12 and an opposite end wall 13, all of equal height. Parallel, normally horizontal walls 14 are connected in suitable manner to the walls 11, 12 and 13. One of the walls 14 is preferably detachable to allow access to and removal of a pair of duplicate reels indicated generally at 15. Suitable means may be employed to detachably retain one of the walls 14 in place. Concentric with the arcuate wall 12, each of the walls 14 is formed with a circular opening 16 adapted to receive spindle means for supporting and driving the reels 15. Also formed in each of the walls 14 are openings 17 to receive locator pins, an aperture or opening 18 to receive transducing elements including a medium guiding pin and medium actuating mechanism comprising a capstan and a pinch roll, hereinafter described. Elongated openings 19 and 20 are formed in each of the walls 14 to receive, respectively, a second guide pin projecting from the transducing apparatus and a machine control element adapted to be actuated by the flexible medium when the tension therein exceeds a predetermined maximum.

Bearing members 21 extend between the walls 14 of the cartridge to receive locator pins projecting from the supporting apparatus and fixed guide pins 22 and 23 are provided at each side of the cartridge to guide a flexible medium or tape, indicated at 24, along an inclined path parallel to the wall 13 and from one of the reels 15 to the other. Fixed supports 22*a* are provided, one at each side of the cartridge, for the guide pins 22 and 23. From the lower reel 15 the medium 24 extends in contact with a metal clip 32 (FIGURES 7 and 8) carried by one of the bearing members 21, then contacts the pins 22 and 23 at the lower side, then crosses the openings 18 to the pins 23 and 22 at the upper side where these pins guide it to the outer surface of a clip 32 carried by the second bearing member 21 and thence to the upper reel 15.

Each of the reels 15 has a substantially cylindrical hub 25 extending between annular guide flanges for the flexible medium and the periphery of the hub is formed with recesses 26 adapted to receive securing members and an inner end portion of the flexible medium to be anchored to the reel hub. Central bearing openings 27 are formed in each reel to receive coaxial spindles projecting from the transducing mechanism and the bearing surface of each reel is formed with recesses 28 to receive a driving member projecting from one of the spindles, a suitable number of the recesses 28 being spaced regularly around the bearing surface 27. There is also a second series of recesses 29 adapted to be engaged by a driving member carried by another coaxial spindle. Recesses 28 and 29 extend to both faces of the reels 15 which are symmetrical and adapted to be used interchangeably on the spindles. Thus the reels may be placed in engagement with the spindles with either of the walls 14 in the lower position overlying the upper wall of the recording machine.

Figure 1:
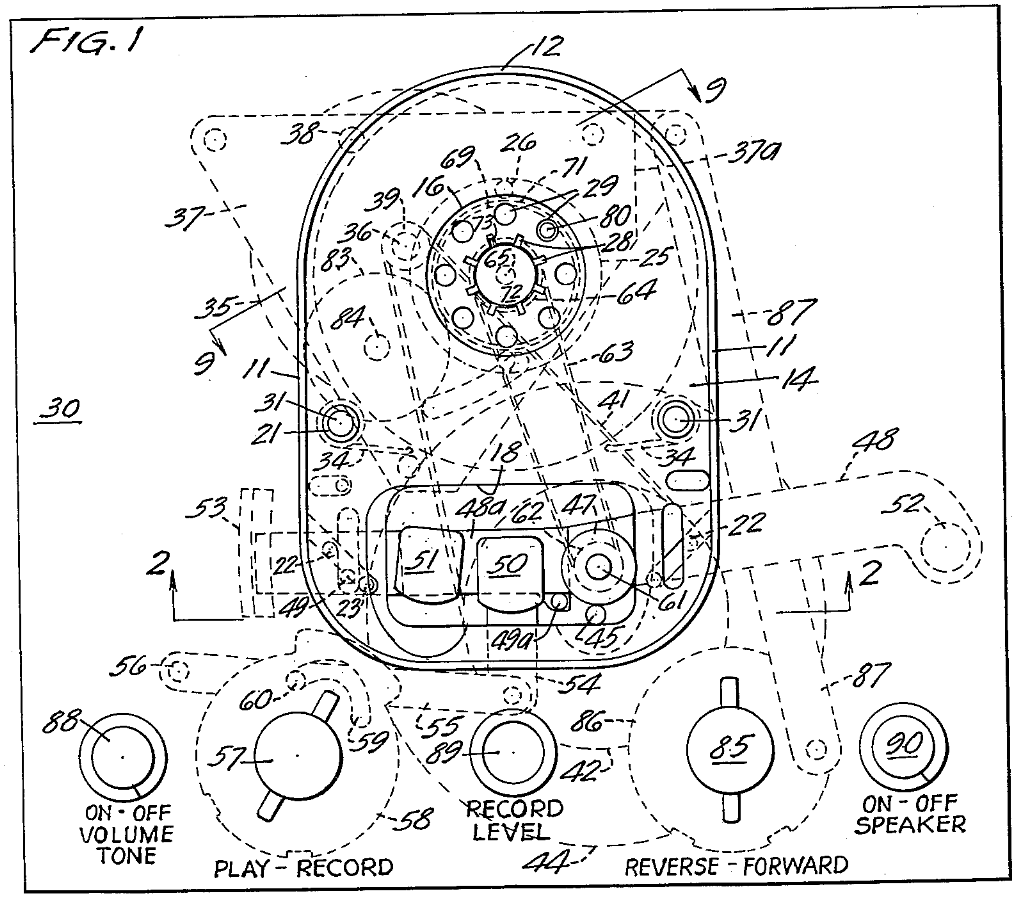
FIGURE 1 is a top plan view showing a first embodiment of our transducing apparatus and cartridge with the several elements in their recording positions.
Figure 5:
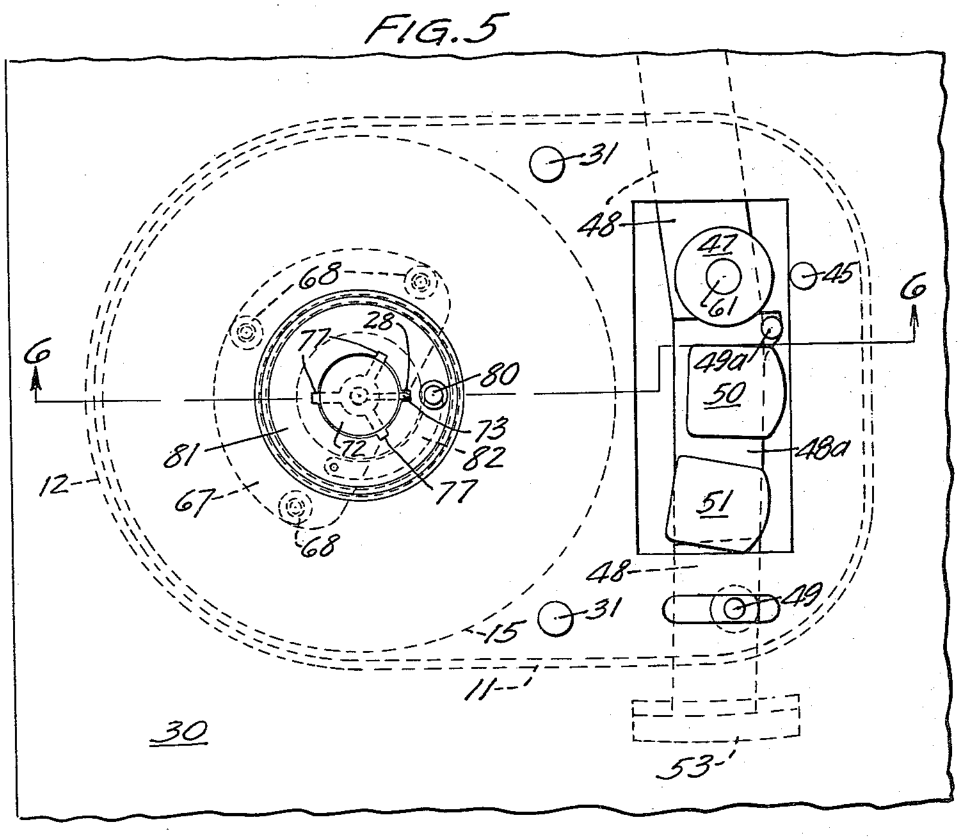
FIG. 5 is a top plan view showing the principal elements of the first embodiment of our transducing apparatus, with the magnetic heads and associated movable elements in partially retracted position, the position of a cartridge being indicated in broken lines.
Figure 6:
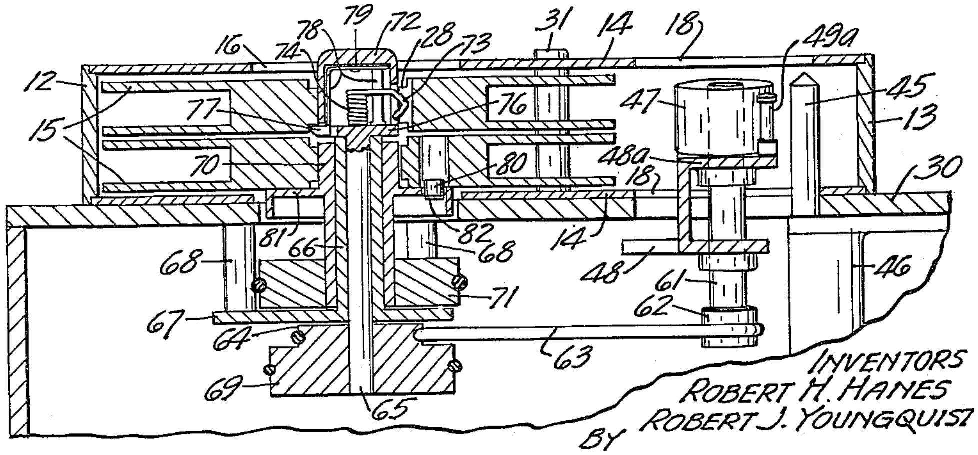
FIG. 6 is a fragmentary cross sectional view of the transducing apparatus and cartridge taken on the line 6—6 of FIG. 5.

As hereinbefore indicated, our cartridge is adapted for use with transducing apparatus having a number of elements which project into the openings in the cartridge casing. Referring to FIGS. 1, 5 and 6, the housing for this apparatus has a horizontally extending top wall 30 and a pair of parallel locator pins 31 projecting upward to afford means for accurately locating and attaching the cartridge to the apparatus. Referring to FIGS. 3, 7 and 8, the attaching means include substantially U-shaped spring clips 32 engaging the bearing members 21 in recesses therein. Each of these clips is formed with a reentrant portion 33 having the shape of a nipple adapted to project through an opening in the bearing member 21 to frictionally engage one of the locator pins 31. A spring finger 34 is integral with each spring clip 32 and projects for frictional engagement with the periphery of one of the reels 15. When the cartridge is removed from the pins 31 and reel actuating spindles of the transducing apparatus, the reels 15 are loosely stacked coaxially and are free for limited lateral and axial movement in the cartridge casing and the spring clips 32 actuate the fingers 34 to press the reels 15 against the arcuate wall 12 to thereby frictionally retain the reels against rotation. This guards against accidental withdrawal of a loop of the flexible medium from the cartridge during handling. Upon placing the cartridge in operative position on the recording apparatus, the reel actuating spindles enter the bearing openings 27 and the locator pins 31 enter the bearing members 21 where they displace the portions 33 of the clips 32 and actuate the fingers 34 to the reel release position indicated in broken lines in FIG. 7. The cartridge is thus accurately positioned on the apparatus and the reels are accurately centered in the cartridge and in engagement with the spindles.

Figure 2:
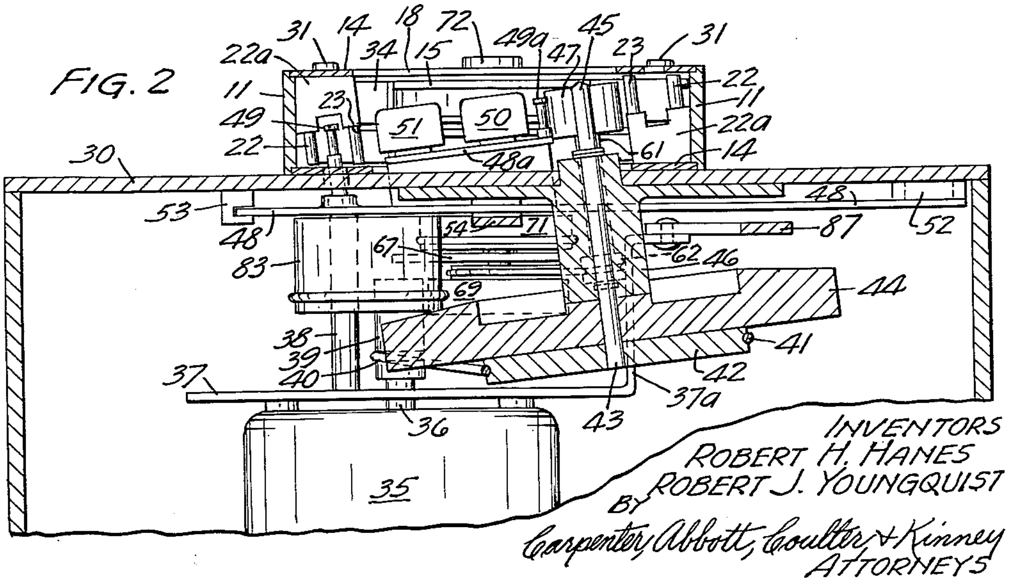
FIG. 2 is a fragmentary vertical sectional view taken approximately on the line 2—2 of FIG. 1.

Pertinent portions of the first embodiment of the transducing apparatus will be described by reference to FIGS. 1, 2, 5, 6 and 9. Power is supplied from an electric motor 35 having a vertically disposed shaft 36. This motor is fastened in suitable manner to a movable supporting plate 37 which may be oscillated about a vertical pivot shaft 38 (FIGS. 1 and 2). Fixed on the motor shaft 36 is a cylindrical head 39 formed with a belt groove 40 and an elongated cylindrical upper end portion. A belt 41 operatively connects the motor shaft to a pulley 42 fixed on a shaft 43. This shaft carries a fly wheel 44 and a coaxial capstan 45 on its upper end. A bearing bracket 46 is secured to the wall 30 and depends therefrom, affording an inclined bearing for the shaft 43. Mounted in confronting relation to the capstan 45 is a pinch roll 47 which is movable to and from the capstan on a supporting arm 48. The pinch roll 47 has a resilient, compressible peripheral surface and when moved to contact the capstan 45 is rotated by frictional engagement with the capstan. When in the record or playback position, the flexible record medium extends between the capstan 45 and pinch roll 47 and is moved by rolling engagement with these driving members.

Also mounted on the horizontally extending arm 48 and movable therewith are guide pins 49 and *49a* and magnetic heads 50 and 51. The head 50 may be a pickup head such as a recording-playback head and the head 51 an erasing head of conventional type. As indicated in FIGS. 2, 5 and 6, these heads, together with the guide pin *49a*, are mounted on the inclined upper surface of a supporting member *48a* carried by the arm 48. An end of this arm is pivotally supported at 52 (FIGS. 1 and 2) on the wall 30 and its other end is slidable in a fixed guide 53. A rigid member 54 extends forwardly from the arm 48 and is operatively connected to a lever 55 which is pivoted at 56 at the lower side of the wall 30.

A manual control is provided for actuating the heads 50 and 51, pinch roll 47 and guide pins 49 and *49a* to and from operative relation to the flexible medium 24. This control comprises a knob 57 fixed on a vertical spindle carrying a cam disk 58 below the wall 30. There is an arcuate cam slot 59 in the disk 58 defined by eccentric surfaces disposed to actuate a pin 60 projecting from the upper surface of the lever 55. By turning the knob 57 counter-clockwise from the position indicated in FIG. 1, the lever 55 may be moved about its pivot 56 to cause the member 54 and arm 48 to move the transducing machine elements including the pinch roll 47, heads 50, 51 and guide pins 49 and *49a* to an inoperative position in rearwardly spaced relation to the flexible medium 24 and capstan 45.

As shown in FIGS. 1 and 6, pinch roll 47 is fixed on a shaft 61 supported in a suitable bearing carried by the arm 48 and a pulley 62 is fixed on the shaft 61 to drive a belt 63 trained on a pulley 64 fixed on a spindle 65. A vertically elongated bearing 66 supports the spindle 65 and is formed with a flange 67 (FIGS. 5 and 6) which is rigidly connected by posts 68 to the wall 30. Projecting from the lower end portion of the spindle 65 is a cylindrical head 69 for frictional engagement with the head 39 on the motor shaft 36.

Coaxially disposed in relation to the spindle 65 and embracing an exterior cylindrical surface of the bearing 66 is a second spindle indicated generally by the numeral 70. This spindle may be rotated independently of the spindle 65 by power applied to a cylindrical head 71 fixed on its lower end portion.

Reel engaging means for the upper reel 15 are provided on the upper end portion of the spindle 65. A hollow head 72 of approximately cylindrical shape is fixed on the spindle 65 and carries a retractable finger 73 adapted to project through an opening in one side of the head. The inner end portion of the finger 73 is integral with a coiled spring 74 which is coaxially mounted in the head 72 to impart resilience to the driving force applied to the upper reel. At its lower end the spring 74 is anchored on an annular flange 76 formed on the spindle 65. There is also a group of three spring actuated lugs 77 mounted in the head 72 and arranged to project through radial slots formed in the periphery of the flange 76. As indicated in FIG. 6, each lug 77 is fastened to the lower end of a spring member 78 which extends up the inner surface of the head 72 and is connected at the top to a member 79 joining the several spring members 78 together. These lugs 77 are disposed to support the upper reel 15 in slightly spaced relation to the lower reel 15 when the reels are in place on the spindles 65 and 70. The lugs 77 spring back in the radial slots in the flange 76 to permit the lower reel 15 to be moved to and from engagement with the spindle 70.

Means for operatively connecting the lower reel 15 to the spindle 70 may comprise a stud 80 mounted on a horizontal flange 81 projecting from the spindle 70. A leaf spring 82 (FIGS. 5 and 6) biases the stud 80 so that it normally projects from the upper surface of the flange 81 but may be retracted to the level of this surface by pressure applied to the upper end of the stud. Being disposed to register with and enter any of the annularly spaced recesses 29 in the lower reel 15, the stud 80 is adapted to rotate this reel with the spindle 70.

During both recording and playback operation, the upper reel 15 is operated as the take-up reel by its connections with the spindle 65. Transmission of power to this spindle is from the capstan 45 to the pinch roll 47 and from the pinch roll shaft 61 to the pulley 62, belt 63 and pulley 64 fixed on the spindle 65. When pinch roll 47 is not in engagement with the capstan 45, the belt 63 is loose and the spindles 65 and 70 may be driven at a relatively high speed by power transmitted either directly from the motor driven head 39 to the head 69 on the spindle 65, or from the head 39 to an idler wheel 83 having a periphery disposed to frictionally engage the driving head 71 on the spindle 70. The cylindrical face of the idler wheel 83 (FIG. 9) is elongated vertically so that it may be frictionally engaged both by the head 71 on the spindle 70 and by the motor driven head 39. Idler wheel 83 is mounted on a vertical shaft 84 which is supported in a suitable bearing depending from the wall 30 and may be held in continuous frictional engagement with the head 71 or may be movably supported and actuated to contact the head 71 when the motor-driven head 39 is in driving contact with this wheel.

As hereinbefore indicated, the motor 35 is mounted on a supporting plate 37 and the latter is pivotally supported from the wall 30 for movement about the axis of a pivot member 38 (FIGS. 1 and 2). Motor supporting plate 37 is biased toward a central position wherein the head 39 is out of contact with both the head 69 and idler wheel 83. For fast forward rotation of the upper reel 15, the plate 37 is moved from its central position clockwise so that the head 39 contacts the head 69 on the spindle 65. Reverse fast rotation of the lower reel is accomplished by bringing the head 39 into driving contact with the idler wheel 83 while the latter is in contact with the head 71 on the spindle 70.

A manual control for the fast forward and reverse operation of the reels may comprise a knob 85 (FIG. 1) projecting above the wall 30 and operatively connected to a cam 86 mounted below this wall. A link 87 connects an eccentric portion of the cam 86 with the motor support 37 as indicated in FIG. 1. This connection includes an upwardly extended portion 37*a* of the plate 37. When the control knob is in the position indicated in FIG. 1, the motor driven head 39 is in its central or neutral position. Clockwise movement of the knob 85 from the neutral position causes the spindle 65 to be turned at the fast forward speed and reverse turning of the knob 85 causes the lower reel carried by the spindle 70 to be operated in the reverse direction.

Manual controls in addition to the knobs 57 and 85 may include a knob 88 for controlling the "On" and "Off," "Volume" and "Tone" of the recorder, a neon record level indicator 89 and a knob 90 for controlling the "On" and "Off" switch for the loud speaker of the reproducing apparatus. These controls form no part of the present invention and may be of conventional or suitable type for controlling electrical parts of the transducing apparatus which are not pertinent to the present invention.

Referring to FIGS. 10 and 11 showing our modified cartridge, this has a single pair of guide pins 23*a* located near a substantially plane front wall 13*a* extending between the side walls 11. Openings 91, 92 and 93 are formed in the wall 13*a* to receive magnetic heads 50, 51 and a pinch roll 47*a*. Each of the walls 14 of the modified cartridge is formed with an elongated, narrow opening 18*a* extending in parallel relation to the wall 13*a* and adjacent thereto. Either of the openings 18*a* is adapted to receive spaced pressure pads 94 and 95 mounted on a bracket 96 and the power actuated capstan 45 projecting above the upper wall 30 of the transducing apparatus.

Location of the pressure pads 94 and 95 is such as to make sliding contact with the back surface of the flexible medium 24 when the heads 50 and 51 are pressed against the front surface of the medium during recording and playback operation. A movable support for the heads 50 and 51 and for a pinch roll 47*a* may comprise a pivoted arm 97, similar to the arm 48. U-shaped guide brackets 98 and 99 (FIG. 10) are fastened to the heads 51 and 50 respectively to be carried thereby to and from contact with the flexible medium. These brackets are formed to properly position the flexible medium 24 in contact with the pads 94 and 95 during recording and playback operation. By actuating the arm 97 the elements of the transducing apparatus carried thereby may be moved from a retracted position such as that indicated in full lines in FIG. 10 to an extended position wherein these elements move the flexible medium back to contact the pads 94 and 95 and capstan 45. When in this extended position, the elements 50, 51, 98 and 99 and 47*a* project through the openings 91, 92 and 93 of the front wall 13*a* of the cartridge. The supporting arm 97 may be moved by linkage such as that hereinbefore described with reference to the arm 48 but in the reverse direction, toward extended position. Thus the arm 97 is moved toward the rear instead of toward the front to cause the heads 50 and 51 and guide brackets 98 and 99 to make contact with the tape and the pinch roll 47*a* to press the tape against the capstan 45.

Transducing apparatus of the modified construction shown in FIGS. 10 and 11 may be adapted for use independently of the cartridge by providing auxiliary guide pins on the wall 30 adapted to be extended when needed or retracted below the upper surface of the wall when the cartridge is to be used. Such auxiliary pins, when extended, may be located in positions corresponding to those of the pins 23*a* of the modified cartridge to take over the function of the latter pins when the reels 15 are used separately from the modified cartridge casing.

In the modified cartridge the magnetic tape is wound with its oxide coating on the outside so that the back or acetate side makes sliding contact with the guides 23*a*, pressure pads 94 and 95 and capstan 45. In contradistinction, it will be evident that in the cartridge of FIGS. 1 to 9 inclusive the tape is wound on the reels with the oxide coating on the inner side, with the result that this side makes contact with the guide pins of the cartridge. By making it feasible to wind the tape with the oxide coating on the outside and the smooth opposite side in contact with the guide members, the modified construction minimizes wear on the tape. This cartridge is also smaller, more compact and simpler, being shorter from front to back and having only one pair of guide pins for contact with the tape. Other advantages are derived from the fact that the relatively small openings 18*a*, 91, 92 and 93 do not substantially weaken the cartridge casing and make it more difficult for unskilled persons to tamper with the tape.

A lightweight, strong and moldable plastic material, e.g., polystyrene, is preferred as a material from which to cast our improved cartridges including the reels, although it will be evident that other materials may be used in the construction, within the purview of the appended claims.

*Summary of Operation*

Access to the reels 15 of the cartridge of either embodiment may be gained by removing one of the walls 14 of the cartridge case. Assuming that the cartridge has been loaded with the reels in stacked relation one to the other and with a supply of the flexible medium 24 or tape connected at one end to one of the reels and at the other end to the other reel, in the cartridge of the first embodiment the medium is extended from one reel to the other under the guidance of the springs 32 carried by the bearing members 21 and pins 22 and 23, as indicated in FIGS. 3 and 4, so that a portion of the medium extends across the openings 18 in the top and bottom walls 14 of the cartridge. In the modified cartridge, the medium is extended from one reel to the other across the openings 91, 92 and 93 under the guidance of the pins 23*a*.

Magnetic tape or other flexible medium in the cartridge of either embodiment may now be placed in operative relation to the transducing apparatus quickly and easily merely by applying the cartridge so that the locator pins 31 enter the openings 17 and bearing members 21, and the coaxial spindle members 72 and 70 enter the bearing openings 27 of the upper and lower reels 15. The central portions of both reels are accessible through the openings 16 in the walls 14.

In passing the lower reel over the spindle head 72, the finger 73 and lugs 77 may be retracted so that the lower reel is free to move down to rest on the flange 81. The lugs 77 spring outward to support the upper reel 15 in slightly spaced relation to the top surface of the lower reel. Thus each reel may be rotated independently of the other and without frictional contact therewith. When the spindles are energized, the stud 80 enters one of the recesses 29 and the finger 73 enters one of the recesses 28 thereby drivingly connecting the reels to the respective spindles. Locator pins 31, when they enter bearing openings 17, engage and actuate reentrant members 33 of spring clips 32 to cause the several fingers 34 to be retracted from the reels. This frees the reels for rotation in the cartridge. Removal of the cartridge may be accomplished merely by lifting it from the locator pins and spindles. The reels and cartridges of both embodiments operate in this manner.

Referring to the first embodiment of the transducing apparatus, FIGS. 1–9, during the attachment or removal of the cartridge, the guide pins 49 and 49*a*, magnetic heads 50 and 51 and pinch roll 47 must be in their retracted positions in rearwardly spaced relation to the portion of the flexible medium extending across the forward end of the cartridge. To retract these machine elements from the path of the medium 24, the knob 57 is turned counter-clockwise to the neutral position from the position shown in FIG. 1. Cam surfaces of the slot 59 are thereby caused to actuate the linkage with the arm 48 so that the latter carries the medium-engaging elements rearwardly. Now as the cartridge is attached to the machine the portion of the medium 24 extending at an incline between the guide pins 23 of the cartridge is located at the front side and in confronting relation to the guide pins 49 and 49*a*, magnetic heads and pinch roll and at the rear side of the capstan 45, but not in direct contact with these elements of the machine.

To start recording or playback operation, the knob 57 is turned to the position indicated in FIG. 1 wherein the flexible medium extending between the reels is guided in contact with the heads 50 and 51 by the pins 49 and 49*a* and is held in contact with the capstan 45 by the pinch roll 47. Guide pins 49 and 49*a* are thus caused to take over the function of the cartridge guide pins 22 and 23 and to accurately guide the medium in operative relation to the magnetic heads. During this operation the speed of the medium across the magnetic heads is determined by the speed of the capstan 45 which is driven through the pulley 42, belt 41 and head 39 fixed on the motor shaft 36. Rotation of the capstan in contact with the pinch roll 47 causes the latter to be rotated together with its axial shaft 61 and the pulley 62 carried thereby. This pulley, in turn, drives the belt 63 in operative engagement with the pulley 64 fixed on the spindle 65. The upper reel 15 is thus rotated in the appropriate direction to take up the flexible medium after it has passed in contact with the magnetic heads. This reel is overdriven to take up slack in the medium caused by variations in the number of layers of medium carried by the upper reel at various times. Overdriving is accomplished by the pulley ratios and by providing a friction drive connection between the shaft 61 and pulley 62. It will be evident that during such operation, sound may be either recorded on or reproduced from the medium 24 passing in contact with the heads 50 and 51.

When it is desired to rewind the magnetic tape or other medium on the lower reel 15, or to wind the medium at the fast rate on the upper reel, the magnetic heads, guide pins 49 and 49*a* and pinch roll 47 are moved back from the tape by manipulation of the knob 57, as hereinbefore described. This causes tension in the belt 63 to be reduced due to the backward movement of the pulley 62 carried by the pinch roll shaft 61. Now the reels may be actuated at a relatively high speed in either forward or reverse direction by suitable manipulation of the control knob 85. To rewind the medium on the lower reel 15, the knob 85 is turned in a counter-clockwise direction from the neutral position shown in FIG. 1. This moves the motor support and presses the motor driven head 39 into driving contact with the periphery of the idler wheel 83. Being in driving contact with the head 71 on the spindle 70, the idler wheel now causes the spindle 70 carrying the lower reel 15 to operate as the take-up reel at the higher speed. To wind the medium at the relatively high speed on the upper reel 15, the knob 85 is turned clockwise from the neutral position shown in FIG. 1. Motor driven head 39 is thereby caused to contact and drive the head 69 fixed on the spindle 65 so that the upper reel 15 is driven as the take-up reel.

Some owners of magnetic recording equipment desire to make their own recordings and to edit them, erase portions of the record and splice the flexible medium after eliminating such portions as are not desired on the reels to be kept as a more or less permanent collection of records. Such recording, editing, elimination of portions and splicing are greatly facilitated by our improved cartridge having reels which may be used separately from the cartridge casing. As hereinbefore described, this separate use of the reels is feasible with both of the embodiments described. When the reels and flexible medium carried by them are used separately from the cartridge casing they are placed in engagement with the coaxial upper and lower spindles 65 and 70 and the medium is threaded manually so that it extends in operative relation to the heads 50 and 51 and between the capstan and pinch roll under the guidance of the machine guide pins. Thus the portion of the medium 24 extending from one of the reels 15 to the other is accessible for cutting and splicing but the recording, playback, fast reverse and fast forward operation of the reels is not affected by the absence of the cartridge casing. When the desired correction of a recording has been completed, the reels may be placed in the cartridge casing for quick and easy attachment to and use with our improved transducing apparatus.

Our cartridges are particularly adapted to contain magnetic tape having a plurality of record lanes. With a two lane tape in the cartridge, one of the lanes is presented in operative relation to the magnetic heads when one of the walls 14 is in contact with the top wall 30 of the machine and the change to another lane is made by merely attaching the cartridge in the inverted position. For binaural or stereo recording a tape having four lanes or tracks may be used in the cartridge, two for operation in each direction. To permit operation with such tape, suitable modifications may be made in the play-record head and amplifying equipment. However, this requires no change in our improved cartridges since either pair of the lanes may be positioned in operative relation to the transducing heads merely by suitable selection of the position of the cartridge on the apparatus.

Due to the simplicity and low cost of our cartridges, including the reels carried thereby, we greatly reduce the cost of recordings which are to be preserved in readily usable form. Storage space for a large number of recordings is substantially reduced by the use of these cartridges which are unusually compact.

An important feature of our transducing apparatus is the provision for rapidly winding the flexible medium selectively on either of the coaxial reels without removing them from their driving spindles. As a result, the selection of the portions of the medium which are to be used at any time, either for recording or playback, is greatly facilitated. Such selection may be made either with the reels contained in the cartridge or when they are used separately from the cartridge.

We claim:

1. Transducing apparatus comprising: a housing, a pickup head and inner and outer coaxial spindles projecting therefrom, said spindles having aligned duplicate cylindrical bearing surfaces, means carried by said inner spindle for driving engagement with a first reel and for positioning the first reel in spaced relation to the housing, retractable detent means carried by said outer spindle for driving engagement with a second duplicate reel and for positioning the second reel in spaced relation to the first reel, first and second duplicate reels each having a central opening bearing on one of said bearing surfaces and each formed for driving engagement with either spindle, a flexible record medium extending from one of said reels to the other, means for positioning the medium in confronting relation to said head, control means for moving said head into operative engagement with said medium or to a retracted inoperative position, power-actuated means in said housing for rotating one of said spindles at a relatively slow speed whereby one of said reels may be operated as a take-up reel during operation of said pickup head, and power-actuated means in said housing for rotating either of said spindles at a relatively high speed when the pickup head is retracted.

2. For transducing apparatus having a housing with a pickup head and a pair of coaxial spindles projecting therefrom, and power-actuated means in said housing for rotating one of said spindles in one direction and the other of said spindles in the opposite direction, an improved cartridge comprising: a casing adapted to be detachably connected to said housing and having spaced substantially parallel walls having aligned openings adapted to receive said spindles through either wall, a pair of duplicate reels loosely stacked coaxially in said casing, each having a central bearing opening formed to receive said spindles and each being formed for selective driving engagement with either spindle when the casing is connected to said housing to fix the reels in position in the casing out of contact with said parallel walls and with each other, means in the casing for positioning a flexible medium extending from one of the reels to the other along a determined path, and reel-positioning means in said casing for maintaining said central bearing openings of the reels in line with said casing spindle-receiving openings for insertion of said spindles, said casing having an aperture adjacent said path for operatively engaging said record medium with said pickup head when the casing is connected to said housing.

3. For transducing apparatus having a housing with a pickup head and a pair of coaxial spindles projecting therefrom, and power-actuated means in said housing for rotating one of said spindles in one direction and the other of said spindles in the opposite direction, an improved cartridge comprising: a casing adapted to be detachably connected to said housing and having spaced substantially parallel walls having aligned openings adapted to receive said spindles through either wall, a pair of duplicate reels loosely stacked coaxially in said casing, each having a central bearing opening formed to receive said spindles and each being formed for selective driving engagement with either spindle when the casing is connected to said housing to fix the reels in position in the casing out of contact with said parallel walls and with each other, means in the casing for positioning a flexible medium extending from one of the reels to the other along a determined path, reel-retaining means in said casing restraining said reels against rotation and maintaining said central bearing openings of the reels in line with said casing spindle-receiving openings for insertion of said spindles, means for releasing said reel-retaining means actuated by connecting the casing to said housing, said casing having an aperture adjacent said path for operatively engaging said record medium with said pickup head when the casing is connected to said housing.

4. For magnetic transducing apparatus having a housing with a magnetic pickup head and a pair of coaxial spindles projecting therefrom, and power-actuated means in said housing for rotating one of said spindles in one direction and the other of said spindles in the opposite direction, an improved cartridge comprising: a casing adapted to be detachably connected to said housing and having spaced substantially parallel walls having aligned openings adapted to receive said spindles through either wall, a pair of duplicate reels loosely stacked coaxially in said casing, each having a central bearing opening formed to receive said spindles and each being formed for selective driving engagement with either spindle when the casing is connected to said housing to fix the reels in position in the casing out of contact with said parallel walls and with each other, magnetic recording tape extending from one of said reels to the other, means in the casing for positioning the recording tape along a determined path, reel-retaining means in said casing restraining said reels against rotation and maintaining said central bearing openings of the reels in line with said casing spindle-receiving openings for insertion of said spindles, and means for releasing said reel-retaining means actuated by connecting the casing to said housing, said casing having an aperture adjacent said path for operatively engaging the recording tape with said magnetic pickup head when the casing is connected to said housing.

5. For magnetic transducing apparatus having a housing with a magnetic recording-playback head, a pair of coaxial spindles projecting therefrom, a pair of locator pins projecting from said housing in parallel relation to said spindles, and power-actuated means in said housing for rotating one of said spindles in one direction and the other of said spindles in the opposite direction, an improved cartridge comprising a casing formed to be detachably connected to said locator pins and having spaced substantially parallel walls having aligned openings adapted to receive said spindles through either wall, a pair of duplicate reels loosely stacked coaxially in said casing, each having a central bearing opening formed to receive said spindles and each being formed for selective driving engagement with either spindle when the casing is connected to said locator pins to fix the reels in position in the casing out of contact with said parallel walls and with each other, means in the casing for positioning a magnetic recording tape extending from one of the reels to the other along a determined path, reel-retaining means in said casing restraining said reels against rotation and maintaining said central bearing openings of the reels in line with said casing spindle-receiving openings for insertion of said spindles, means disposed to be actuated by said locator pins upon connecting the casing to the locator pins for moving said reel-retaining means to release the reels, said casing having an aperture adjacent said path for operatively engaging the recording tape with said magnetic head when the casing is connected to said locator pins.

6. Transducing apparatus comprising: a housing, a pickup head and inner and outer coaxial spindles projecting therefrom, said spindles having aligned duplicate cylindrical bearing surfaces, means carried by said inner spindle for driving engagement with a first reel and for positioning the first reel in spaced relation to the housing, means carried by said outer spindle for driving engagement with a second duplicate reel and for positioning the second reel in spaced relation to the first reel, means for positioning a flexible medium extending from said first reel to said second reel along a determined path in confronting relation to said pickup head, control means for engaging and disengaging said medium and said pickup head, and power-actuated means in said housing for rotating one of said spindles whereby one of said reels may be operated as a take-up reel during engagement of said pickup head and medium, and power-actuated means in said housing for rotating the other of said spindles whereby the other of said reels may be operated as a rewind reel during disengagement of said pickup head and medium.

7. Transducing apparatus comprising: a housing, a pickup head and inner and outer coaxial spindles projecting therefrom, said spindles having aligned duplicate cylindrical bearing surfaces, means carried by said inner spindle for driving engagement with a first reel and for positioning the first reel in spaced relation to the housing, retractable detent means carried by said outer spindle for driving engagement with a second duplicate reel and for positioning the second reel in spaced relation to the first reel, means for positioning a flexible medium extending from said first reel to said second reel along a determined path in confronting relation to said pickup head, control means for engaging and disengaging said medium and said pickup head, and power-actuated means in said housing for rotating one of said spindles at a relatively slow speed whereby one of said reels may be operated as a take-up reel during engagement of said pickup head and medium, and power-actuated means in said housing for rotating either of said spindles at a relatively high speed during disengagement of said pickup head and medium.

8. Transducing apparatus comprising: a housing, a pickup head, inner and outer coaxial spindles projecting therefrom, said spindles having aligned duplicate cylindrical bearing surfaces, means carried by said inner spindle for driving engagement with a first reel and for positioning the first reel in spaced relation to the housing, means carried by said outer spindle for driving engagement with a second duplicate reel and for positioning the second reel in spaced relation to the first reel, power-actuated means in said housing for rotating one of said spindles in one direction and the other of said spindles in the opposite direction, a cartridge casing adapted to be detachably connected to said housing and having spaced substantially parallel walls having aligned openings adapted to receive said spindles through either wall, first and second duplicate reels loosely stacked coaxially in said casing, each having a central opening formed to bear on one of said bearing surfaces and each formed for driving engagement with either spindle, and means in said casing for positioning a flexible record medium extending from one of said reels to the other along a determined path, said casing having an aperture adjacent said path for operatively engaging said record medium with said pickup head when the casing is connected to said housing.

9. Transducing apparatus comprising: a housing, a pickup head, a pair of coaxial spindles projecting therefrom, means carried by each of said spindles for driving engagement with a reel, power-actuated means in said housing for rotating one of said spindles in one direction and the other of said spindles in the opposite direction, a cartridge casing adapted to be detachably connected to said housing and having spaced substantially parallel walls having aligned openings adapted to receive said spindles through either wall, a pair of duplicate reels loosely stacked coaxially in said casing, each having a central bearing opening formed to receive said spindles for selective driving engagement with either of said spindles when the casing is connected to the housing to fix the reels in position in the casing out of contact with said parallel walls and with each other, means in the casing for positioning a flexible record medium extending from one of the reels to the other along a determined path, and reel-positioning means in said casing for maintaining said central bearing openings of the reels in line with said casing spindle-receiving openings for insertion of said spindles, said casing having an aperture adjacent said path for operatively engaging the record medium with said pickup head when the casing is connected to said housing.

10. Magnetic transducing apparatus comprising: a housing, a magnetic pickup head, a pair of coaxial spindles projecting therefrom, means carried by each of said spindles for driving engagement with a reel, power-actuated means in said housing for rotating one of said spindles in one direction and the other of said spindles in the opposite direction, a cartridge casing adapted to be detachably connected to said housing and having spaced substantially parallel walls having aligned openings adapted to receive said spindles through either wall, a pair of duplicate reels loosely stacked coaxially in said casing, each having a central bearing opening formed to receive said spindles for selective driving engagement with either of said spindles when the casing is connected to said housing to fix the reels in position in the casing out of contact with said parallel walls and with each other, means in the casing for positioning a magnetic recording tape extending from one of the reels to the other along a determined path, reel-retaining means in said casing restraining said reels against rotation and maintaining said central bearing openings of the reels in line with said casing spindle-receiving openings for insertion of said spindles, means for releasing said reel-retaining means actuated by connecting the casing to said housing, said casing having an aperture adjacent said path for operatively engaging the recording tape with said magnetic head when the casing is connected to said housing, and means projecting from said housing for guiding the recording tape in operative relationship to the magnetic head.

References Cited in the file of this patent

UNITED STATES PATENTS

| | | |
|---|---|---|
| 1,568,067 | Howell | Jan. 5, 1926 |
| 1,665,784 | Hornauer | Apr. 10, 1928 |
| 2,349,018 | Tasker | May 16, 1944 |
| 2,478,775 | Mundt | Aug. 9, 1949 |
| 2,487,170 | Nygaard | Nov. 8, 1949 |
| 2,499,895 | Walker | Mar. 7, 1950 |
| 2,507,385 | Shrader | May 9, 1950 |
| 2,535,478 | Arndt | Dec. 26, 1950 |
| 2,568,601 | Anderson | Sept. 18, 1951 |
| 2,633,305 | Kaylor | Mar. 31, 1953 |
| 2,668,021 | Gleason | Feb. 2, 1954 |
| 2,682,410 | Bauman | June 29, 1954 |
| 2,702,834 | Golle et al. | Feb. 22, 1955 |
| 2,732,144 | Jones | Jan. 24, 1956 |
| 2,778,637 | Eash | Jan. 22, 1957 |
| 2,793,039 | Hironimus | May 21, 1957 |
| 2,866,010 | Dale | Dec. 23, 1958 |
| 2,867,389 | Viets | Jan. 7, 1959 |
| 2,894,700 | Roberts et al. | July 14, 1959 |
| 2,914,620 | Dale | Nov. 24, 1959 |